United States Patent [19]

Traulsen

[11] 4,147,314
[45] Apr. 3, 1979

[54] WINDING TOOL FOR MAGNETIC TAPE CASSETTES

[76] Inventor: David E. Traulsen, 150 Cypress La., Watsonville, Calif. 95076

[21] Appl. No.: 860,396

[22] Filed: Dec. 14, 1977

[51] Int. Cl.² .............................................. G11B 15/42
[52] U.S. Cl. .................................... 242/179; 74/545; 242/96; 242/199
[58] Field of Search ............... 242/199, 200, 179, 201, 242/84.8, 96, 71.7, 71.2, 54 R, 55; 74/548, 550, 549, 547, 543, 545

[56] References Cited
U.S. PATENT DOCUMENTS

| | | | |
|---|---|---|---|
| 3,854,670 | 12/1974 | Bertolazzi | 242/67.4 |
| 3,999,725 | 12/1976 | Arbib | 242/199 |

FOREIGN PATENT DOCUMENTS 2152572 7/1973 Fed. Rep. of Germany.

*Primary Examiner*—George F. Mautz
*Attorney, Agent, or Firm*—Lowhurst & Aine

[57] ABSTRACT

A winding tool for engaging the sprocket of a magnetic tape cassette which is of unitary construction. It has an elongated body which includes a handle portion and a blade portion. The blade portion is tapered downwardly to the end of the winding tool and has a pair of diametrically opposed keys or flutes which fit into the space between adjacent sprocket teeth, and which is dimensioned to bear against the end surface of the sprocket teeth and the interior surface of the sprocket when the blade portion is inserted into the sprocket about one-half of its length.

4 Claims, 6 Drawing Figures

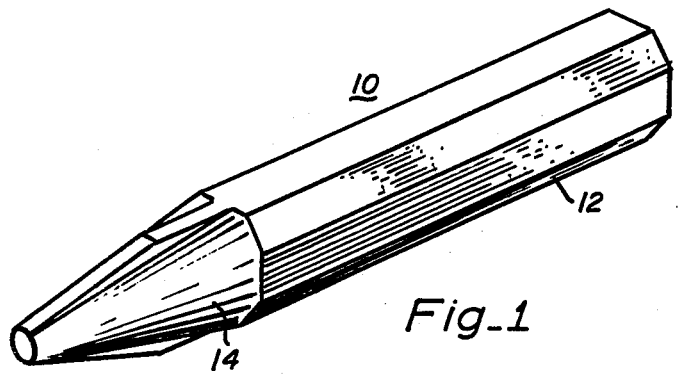
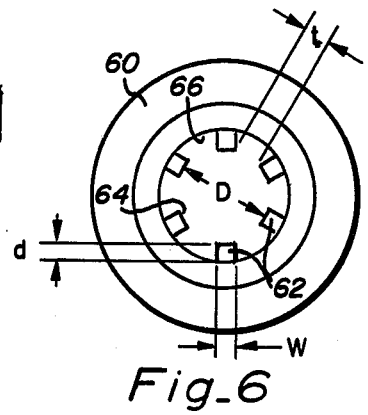
Fig_1
Fig_6
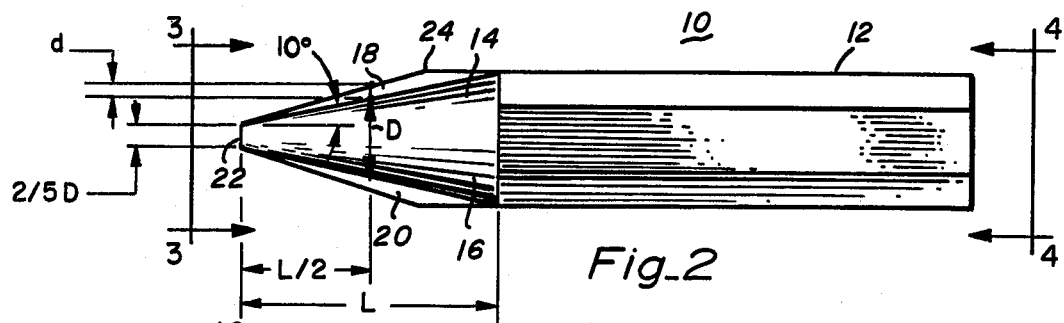
Fig_2
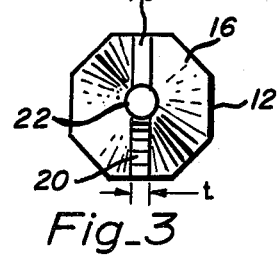
Fig_3
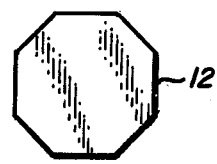
Fig_4
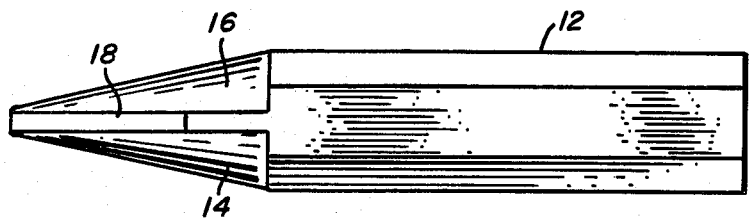
Fig_5

WINDING TOOL FOR MAGNETIC TAPE CASSETTES

BACKGROUND OF THE INVENTION

This invention relates to a winding tool for magnetic tape cassettes, and more particularly to a screw driver type of tool which engages the sprocket of a magnetic tape cassette to rotate the sprocket without damaging it.

It is often desirable to rotate either the supply or the take-up reel of a magnetic tape cassette for the purpose of either winding tape back into the cassette or for freeing a bind in the tape or the tape conveying means. Oftentimes, when a tape is torn, a certain tape portion is let out of the cassette for splicing purposes and after splicing it is desirable to rotate the take-up reel to wind the tape back into the cartridge. Other times, the tape may not lie flat and cause a bind which can best be freed, without damaging the tape, by turning either the take up or the supply reel in one or the other direction.

Heretofore, rotating the take-up or supply reel of a tape cassette was accomplished by using whatever was handy and would somehow engage the teeth or portions of the teeth of the reel sprocket. One handy and often used device is a pencil which has a diameter to fit into the opening defined by the end surface of the sprocket teeth and which is then skewed at an angle to grab the sprocket which often causes damage to the delicate reels to thereby destroy the cassette.

SUMMARY OF THE INVENTION

It is therefore an object of the present invention to provide a winding tool which allows the sprocket of a reel in a cassette to be rotated without any damage to the reel.

It is further an object of the present invention to provide a unitary winding tool for engaging the sprocket of a magnetic tape cassette reel which is inexpensive, simple to use, and does not damage the reel in any manner whatsoever.

It is another object of the present invention to provide a simple and inexpensive tool for turning the sprocket of a tape cartridge reel in either direction which is simple to use and effective to wind the tape in the cassette in any direction.

In accordance with the present invention, there is provided an elongated body which has a handle portion and a blade portion, the blade portion being provided with a pair of diametrically opposed keys or flutes which fit between the teeth of the sprocket. The blade portion is tapered and dimensioned such that when the blade portion is inserted about half way into the sprocket, the keys extend all the way to the bottom of the slot defined by the sprocket teeth and the body of the blade portion touches the end surface of the sprocket teeth.

BRIEF DESCRIPTION OF THE DRAWINGS

FIG. 1 is a perspective view of the winding tool of the present invention;

FIG. 2 is a side view of the winding tool of the present invention with the keys in a vertical plane;

FIG. 3 is an end view taken along line 3—3 of FIG. 2;

FIG. 4 is an end view taken along line 4—4 of FIG. 2;

FIG. 5 is a side view of the winding tool of the present invention with the keys in a horizontal plane; and FIG. 6 is a top view of a reel in a tape cassette showing details in the sprocket part thereof.

DETAILED DESCRIPTION OF THE DRAWINGS

Referring now to the drawings and particularly to FIGS. 1 to 5 thereof, there is shown a winding tool 10 in accordance with the present invention which is in the form of an elongated body having handle portion 12 and a blade portion 14. Handle portion 12 may have an octogonal cross section so that it can easily be rotated when hand-held, or may have any convenient shape allowing it to be gripped by hand to be rotated.

Blade portion 14 has a tapered body 16 which is generally of diminishing circular cross section, and depending outwardly from body 16 are a pair of diametrically opposed keys 18 and 20. The entire structure so far explained is of unitary construction and can be made of plastic or metal depending on the use contemplated and cost allowable.

Referring now to FIG. 6, there is shown a top view of a tape reel 60 with an internal sprocket at its hub, such as is generally used in tape cassettes. The sprocket portion includes six sprocket teeth 62 with each having a width "W" and a height "d". The end surfaces 64 of sprocket teeth 62 define an internal cylindrical, interrupted surface which has a diameter "D", and the cylindrical surface 66 from which teeth 62 depend defines another cylindrical surface whose diameter is D+2d. Finally, the space between two adjacent teeth, measured at surface 64, defines a gap having a width "t" which is generally engaged by the teeth of the pinion gear of the recorder.

Returning now to winding tool 10, and particularly to FIG. 2 thereof, its dimensions are carefully selected for easy insertion and removal. If the length of the blade portion is "L" then the diameter of the tapered 16 at the midpoint of the blade portion is selected to be "D" which is equal to the internal diameter of the surface 64 of the teeth of reel 60. Further, the height of keys or flutes 18 and 20, at the midpoint of the blade portion, is selected to be equal to "d" so that the keys more or less contact surface 66 of sprocket 60 when winding tool 10 is inserted half way. Further, the taper of tapered portion 14 is selected to be approximately 10° with respect to the center line which determines the size of the end surface 22 as well as the flat-to-flat thickness of handle portion 12 in case of an octogonal cross section or the diameter in case of a circular cross section. As a practical matter, making "L" approximately equal to "3D" has proved to be a good compromise between preventing binding in the sprocket portion and still allowing it to be threaded in carefully to engage the teeth.

As far as keys 18 and 20 are concerned, they are starting at zero height above body 16 at end surface 22 and then taper rectilinearly to a height of "D" at the midpoint of the blade portion 14 and then continue to taper outwardly until, at a point 24, they reach the dimension of handle portion 12 at which time the surface of the key continues on parallel and no longer taper outwardly.

There has been described a winding tool for engaging the sprocket hub of a cassette reel which is dimensioned for maximum effectiveness, ease of insertion and removal, and which is inexpensive, easy to use and which allows reel rotation in either direction.

What is claimed is:

1. A winding tool for engaging the sprocket portion of a tape cassette reel comprising:
- an elongated body forming a handle portion and a blade portion, said blade portion including two diametrically opposed keys having a width dimension to fit in the space between two adjacent sprocket teeth;
- said blade portion having a circular cross section between said keys which tapers from the dimension of said handle portion to a smaller circular end surface, with the dimension of the circular cross section of the midpoint of said blade portion being selected for substantial half-way insertion into the sprocket portion; and
- said keys having a height dimension selected to be substantially equal to the sprocket tooth height at half-way insertion of said blade portion into the sprocket portion, and being tapered to zero height at said smaller circular end surface.

2. A winding tool for engaging the sprocket portion of a tape cassette reel, the sprocket portion having an internal bore dimension equal to "D" defined by the peripheral surface of a plurality of sprocket teeth which have a height dimension equal to "d" and a separation dimension equal to "t" measured at the internal bore, said winding tool comprising:
- an elongated body forming a handle portion and a blade portion, said blade portion having two diametrically opposed keys having a width dimension equal to "t";
- said blade portion having an axial length dimension equal to "L" and a circular cross section between said keys which tapers rectilinearly from the dimension of said handle portion to a smaller circular end surface, with the dimension of circular cross section at the midpoint of said blade portion being equal to "D"; and
- said keys having a height dimension which is equal to "d" at the midpoint of said blade portion and which tapers rectilinearly downwards from said midpoint to zero height at said circular end surface and upwards from said midpoint to the dimension of said handle portion.

3. A winding tool in accordance with claim 2 in which the length "L" of said blade portion is between 2.5D and 3.5D.

4. A winding tool in accordance with claim 2 in which the taper of said blade portion is between 8° and 12° with respect to the center line of said elongated body.

* * * * *